US012359735B2

United States Patent
Knoles et al.

(10) Patent No.: US 12,359,735 B2
(45) Date of Patent: Jul. 15, 2025

(54) SPRING STOP FOR CLAPPER VALVE

(71) Applicant: Acorn Engineering Company, Inc., City of Industry, CA (US)

(72) Inventors: Edward Barry Knoles, Duarte, CA (US); Luis Fernando Prieto, Chino, CA (US); Alan Long Thien Du, Covina, CA (US); Pui Yuen Ng, Eastvale, CA (US); Arturo Gomez, Moreno Valley, CA (US); Adrian Alexander Filip, Corona, CA (US)

(73) Assignee: Acorn Engineering Company, Inc., City of Industry, CA (US)

( * ) Notice: Subject to any disclaimer, the term of this patent is extended or adjusted under 35 U.S.C. 154(b) by 17 days.

(21) Appl. No.: 18/369,730

(22) Filed: Sep. 18, 2023

(65) Prior Publication Data

US 2024/0093796 A1 Mar. 21, 2024

Related U.S. Application Data

(60) Provisional application No. 63/407,463, filed on Sep. 16, 2022.

(51) Int. Cl.
*F16K 15/03* (2006.01)
*F16K 25/00* (2006.01)

(52) U.S. Cl.
CPC ............ *F16K 15/033* (2013.01); *F16K 25/00* (2013.01)

(58) Field of Classification Search
CPC ............................... F16K 15/03; F16K 15/033
See application file for complete search history.

(56) References Cited

U.S. PATENT DOCUMENTS

| 4,249,568 | A | | 2/1981 | Duggan |
| 5,046,525 | A | | 9/1991 | Powell |
| 5,584,315 | A | * | 12/1996 | Powell ..................... F16K 15/03 |
| | | | | 137/454.2 |
| 5,711,341 | A | | 1/1998 | Funderburk et al. |
| 5,913,331 | A | | 6/1999 | Noll et al. |
| 6,443,181 | B1 | | 9/2002 | Powell |

* cited by examiner

*Primary Examiner* — P. Macade Nichols
(74) *Attorney, Agent, or Firm* — The Webb Law Firm

(57) ABSTRACT

A spring stop arrangement for a check valve may include: a check seat defining a flow path; a clapper assembly connected to the check seat and configured to obstruct the flow path, the clapper assembly including: a clapper; and a seal retainer detachably mounted to the clapper; a cam arm connected to the check seat, the cam arm including a stopper; and a torsion spring operatively connected to the cam arm so as to apply a biasing force to the cam arm against the direction of fluid flow. When the seal retainer is dismounted from the clapper, the stopper may be configured to contact the check seat so as to prevent rotation of the cam arm.

20 Claims, 6 Drawing Sheets

SPRING STOP FOR CLAPPER VALVE

CROSS REFERENCE TO RELATED APPLICATIONS

This application claims priority to U.S. Provisional Patent Application Ser. No. 63/407,463, titled "Spring Stop for Clapper Valve" and filed on Sep. 16, 2022, the disclosure of which is incorporated herein in its entirety.

BACKGROUND OF THE INVENTION

Field of the Invention

This present disclosure relates to a spring stop for use on a check valve.

Description of Related Art

Check valves create a stop for fluid flow within a greater fluid flow system. They are biased to stop the flow of fluid in one direction, and the biasing forces only give way to fluid flow once the cracking pressure is reached. The cracking pressure is the minimum differential upstream pressure between the inlet and the outlet of the check valve. In other words, the cracking pressure is reached when the forces of the fluid flow overcome the biasing forces of the check valve.

Due to the high pressures created within fluid flow systems, the biasing forces of check valves must be equally strong. This creates a problem when performing maintenance on check valves. The elements creating the biasing forces do not easily disengage from other features of the check valve. This can create violent and dangerous movements of metal parts which can lead to serious injury.

This arrangement is seen in the prior art and is shown in FIGS. 1 and 2. The prior art check valve assembly 1 includes a check seat 2 defining a fluid flow path F and a clapper assembly 3, arranged to obstruct the fluid flow path F. The clapper assembly 3 includes a seal cap 4 and a clapper 5, with the seal cap 4 mounted to the clapper 5 via screws S. The clapper 5 is connected to the check seat 2 so as to be able to move when the force created by the fluid flow exceeds the cracking pressure of the valve assembly 1. The clapper 5 also contacts a downstream side of the check seat 2 when the clapper assembly 3 is obstructing the fluid flow path F. This stops any upstream movement of the clapper assembly 3.

A first extension 6 extends from the seal cap 4 in an upstream direction, and a second extension 7 extends from the check seat 2 in an upstream direction. A cam arm 8 is arranged to be engaged with both of the extensions 6, 7. The cam arm 8 contacts the first extension 6 and is mounted to the second extension 7. To create the cracking pressure, a torsion spring 9 is operatively connected to the cam arm 8. The torsion spring 9 provides a spring force that acts on the cam arm 8. This action can urge the cam arm 8 in a direction relative to the check seat 2, so that the contact between the cam arm 8 and the first extension 6 then urges the first extension 6 upstream, which arranges for the clapper assembly 3 to obstruct the fluid flow path by bringing the clapper 5 in contact with the downstream side of the check seat 2. The closed position is shown in FIG. 1.

Fluid often flows at high rates within the systems that use the check valve assembly 1. This creates high pressures when the fluid contacts parts of the assembly 1, such as the seal cap 4 and clapper 5. The torsion spring 9 must therefore apply a similarly high force to the cam arm 8, so that the clapper assembly 3 can stay shut against the high pressures created by the fluid flow. During maintenance, however, it can be dangerous to interact with parts of the check valve assembly 1 as the torsion spring 9 is still applying its spring force to the cam arm 8. In particular, the seal cap 4 often needs to be dismounted from the clapper 5, so that maintenance can be performed on both the seal cap 4 and the clapper 5. When the screws S are removed from the seal cap 4 and clapper 5, the check valve assembly can be considered to be in a maintenance position. Dismounting the seal cap 4 means the cam arm 8 maintains contact with the first extension 6, but the clapper 5 is no longer preventing the upstream movement of the seal cap 4. The spring force may then cause the cam arm 8, first extension 6, and seal cap 4 to quickly and violently rotate about the second extension 7. The direction of rotation is identified by the arrow in FIG. 2. The cam arm 8, first extension 6, and seal cap 4 are shown partially rotated in a maintenance position in FIG. 2. This movement is dangerous and can seriously injury anyone performing maintenance on the check valve assembly 1.

Given the state of the art, there is a need for check valves that have features that prevent sudden and potentially violent movement of different parts still experiencing the biasing force(s) used to operate the check valve when the check valve is undergoing maintenance.

SUMMARY OF THE INVENTION

In one embodiment or disclosure, a spring stop arrangement for a check valve may include: a check seat defining a flow path; a clapper assembly connected to the check seat and configured to obstruct the flow path, the clapper assembly including: a clapper; and a seal retainer detachably mounted to the clapper; a cam arm connected to the check seat, the cam arm including a stopper; and a torsion spring operatively connected to the cam arm so as to apply a biasing force to the cam arm against the direction of fluid flow. When the seal retainer is dismounted from the clapper, the stopper may be configured to contact the check seat so as to prevent rotation of the cam arm.

The check seat may include a first extension extending in an upstream direction, the first extension including a first shaft about which the cam arm is rotatably mounted, and the torsion spring may at least partially extend about the first shaft. The stopper may extend from a portion of the cam arm proximate the first shaft, and the stopper may extend to a boundary point. The check seat may define a cavity configured to receive the stopper therein upon the dismounting of the seal retainer from the clapper. The seal retainer may include a second extension extending in an upstream direction, the second extension including a second shaft defining a roller. When the seal retainer is mounted to the clapper, the cam arm may be configured to contact the roller so as to bias the clapper assembly against the direction of fluid flow, thereby obstructing the flow path.

The cam arm may define a path configured to receive at least a portion of the second shaft therein. The path may define a bearing surface configured to contact the second shaft. The seal retainer may define a cavity configured to receive at least a portion of the cam arm therein. The check seat may include an upstream side and a downstream side, and the stopper may contact the upstream side. The clapper assembly may be mounted to the downstream side. The clapper may be hingedly mounted to the downstream side. The seal retainer may be mounted to the check seat by at least one fastener.

In another aspect or embodiment of the present disclosure, a spring stop arrangement for a check valve may include: a check seat extending from the valve body, the check seat including: an upstream side; a downstream side opposing the upstream side; an interior portion extending between the upstream side and the downstream side, the interior portion defining a fluid flow path; and a first extension extending from the upstream side in an upstream direction; a clapper assembly connected to the downstream side and configured to obstruct the flow path, the clapper assembly including: a clapper; a seal retainer detachably mounted to the clapper; and a second extension extending from the seal retainer in the upstream direction; a cam arm rotatably mounted to the first extension, the cam arm comprising a stopper; and a torsion spring operatively connected to the cam arm so as to supply a biasing force to the cam arm against the direction of fluid flow. When the seal retainer is mounted to the clapper, the cam arm may be configured to contact the second extension so as to bias the clapper assembly against the direction of fluid flow, thereby obstructing the flow path. When the seal retainer is dismounted from the clapper, the stopper may be configured to contact the upstream side so as to prevent rotation of the cam arm.

The cam arm may include a body having a first end and a second end, the first end being rotatably mounted to the first extension. The stopper may extend from the first end to a boundary point, the stopper and the first end defining a receiving slot therebetween, the receiving slot configured to receive a portion of the torsion spring therein. The torsion spring may extend about the first extension with a first portion of the torsion spring extending about the first extension on one side of the cam arm and a second portion of the torsion spring extending about the first extension on an opposing side of the cam arm, and wherein the portion of the torsion spring received within the receiving slot connects the first portion and the second portion. The first extension may include a shaft, and the first end of the cam arm may be rotatably mounted to the shaft, and the torsion spring may extend about the shaft. The cam arm may define a path disposed between the first end and the second end, the path being configured to receive at least a portion of the second shaft therein. The upstream side may define a cavity configured to receive the stopper therein. The cavity may include a contact surface to contact the stopper when the seal retainer is dismounted from the clapper.

In some embodiments or aspects, the present disclosure can be characterized by the following clauses.

Clause 1. A spring stop arrangement comprising: a check seat defining a flow path; a clapper assembly connected to the check seat and configured to obstruct the flow path, the clapper assembly comprising: a clapper; and a seal retainer detachably mounted to the clapper; a cam arm connected to the check seat, the cam arm comprising a stopper; and a torsion spring operatively connected to the cam arm so as to apply a biasing force to the cam arm against the direction of fluid flow, wherein, when the seal retainer is dismounted from the clapper, the stopper is configured to contact the check seat so as to prevent rotation of the cam arm.

Clause 2. The spring stop arrangement of clause 1, wherein the check seat comprises a first extension extending in an upstream direction, the first extension comprising a first shaft about which the cam arm is rotatably mounted, and wherein the torsion spring at least partially extends about the first shaft.

Clause 3. The spring stop arrangement of clause 2, wherein the stopper extends from a portion of the cam arm proximate the first shaft, and wherein the stopper extends to a boundary point.

Clause 4. The spring stop arrangement of any of clauses 1-3, wherein the check seat defines a cavity configured to receive the stopper therein upon the dismounting of the seal retainer from the clapper.

Clause 5. The spring stop arrangement of any of clauses 1-4, wherein the seal retainer comprises a second extension extending in an upstream direction, the second extension comprising a second shaft defining a roller, and wherein, when the seal retainer is mounted to the clapper, the cam arm is configured to contact the roller so as to bias the clapper assembly against the direction of fluid flow, thereby obstructing the flow path.

Clause 6. The spring stop arrangement of clause 5, wherein the cam arm defines a path configured to receive at least a portion of the second shaft therein.

Clause 7. The spring stop arrangement of clause 6, wherein the path defines a bearing surface configured to contact the second shaft.

Clause 8. The spring stop arrangement of any of clauses 1-7, wherein the seal retainer defines a cavity configured to receive at least a portion of the cam arm therein.

Clause 9. The spring stop arrangement of any of clauses 1-8, wherein the check seat comprises an upstream side and a downstream side, and wherein the stopper contacts the upstream side.

Clause 10. The spring stop arrangement of clause 9, wherein the clapper assembly is mounted to the downstream side.

Clause 11. The spring stop arrangement of clause 10, wherein the clapper is hingedly mounted to the downstream side.

Clause 12. The spring stop arrangement of any of clauses 1-11, wherein the seal retainer is mounted to the check seat by at least one fastener.

Clause 13. A spring stop arrangement comprising: a check seat extending from the valve body, the check seat comprising: an upstream side; a downstream side opposing the upstream side; an interior portion extending between the upstream side and the downstream side, the interior portion defining a fluid flow path; and a first extension extending from the upstream side in an upstream direction; a clapper assembly connected to the downstream side and configured to obstruct the flow path, the clapper assembly comprising: a clapper; a seal retainer detachably mounted to the clapper; and a second extension extending from the seal retainer in the upstream direction; a cam arm rotatably mounted to the first extension, the cam arm comprising a stopper; and a torsion spring operatively connected to the cam arm so as to apply a biasing force to the cam arm against the direction of fluid flow, wherein, when the seal retainer is mounted to the clapper, the cam arm is configured to contact the second extension so as to bias the clapper assembly against the direction of fluid flow, thereby obstructing the flow path, wherein, when the seal retainer is dismounted from the clapper, the stopper is configured to contact the upstream side so as to prevent rotation of the cam arm.

Clause 14. The spring stop arrangement of clause 13, wherein the cam arm comprises a body having a first end and a second end, the first end being rotatably mounted to the first extension.

Clause 15. The spring stop arrangement of clause 14, wherein the stopper extends from the first end to a second boundary point, the stopper and the first end defining a receiving slot therebetween, the receiving slot configured to receive a portion of the torsion spring therein.

Clause 16. The spring stop arrangement of clause 15, wherein the torsion spring extends about the first extension with a first portion of the torsion spring extending about the first extension on one side of the cam arm and a second portion of the torsion spring extending about the first extension on an opposing side of the cam arm, and wherein the portion of the torsion spring received within the receiving slot connects the first portion and the second portion.

Clause 17. The spring stop arrangement of clause 16, wherein the first extension comprises a shaft, and wherein the first end of the cam arm is rotatably mounted to the shaft, and the torsion spring extends about the shaft.

Clause 18. The spring stop arrangement of any of clauses 14-17, wherein the cam arm defines a path disposed between the first end and the second end, the path being configured to receive at least a portion of the second shaft therein.

Clause 19. The spring stop arrangement of any of clauses 13-18, wherein the upstream side defines a cavity configured to receive the stopper therein.

Clause 20. The spring stop arrangement of clause 19, wherein the cavity comprises a contact surface to contact the stopper when the seal retainer is dismounted from the clapper.

BRIEF DESCRIPTION OF THE DRAWING(S)

DESCRIPTION OF THE INVENTION

Figure 1:
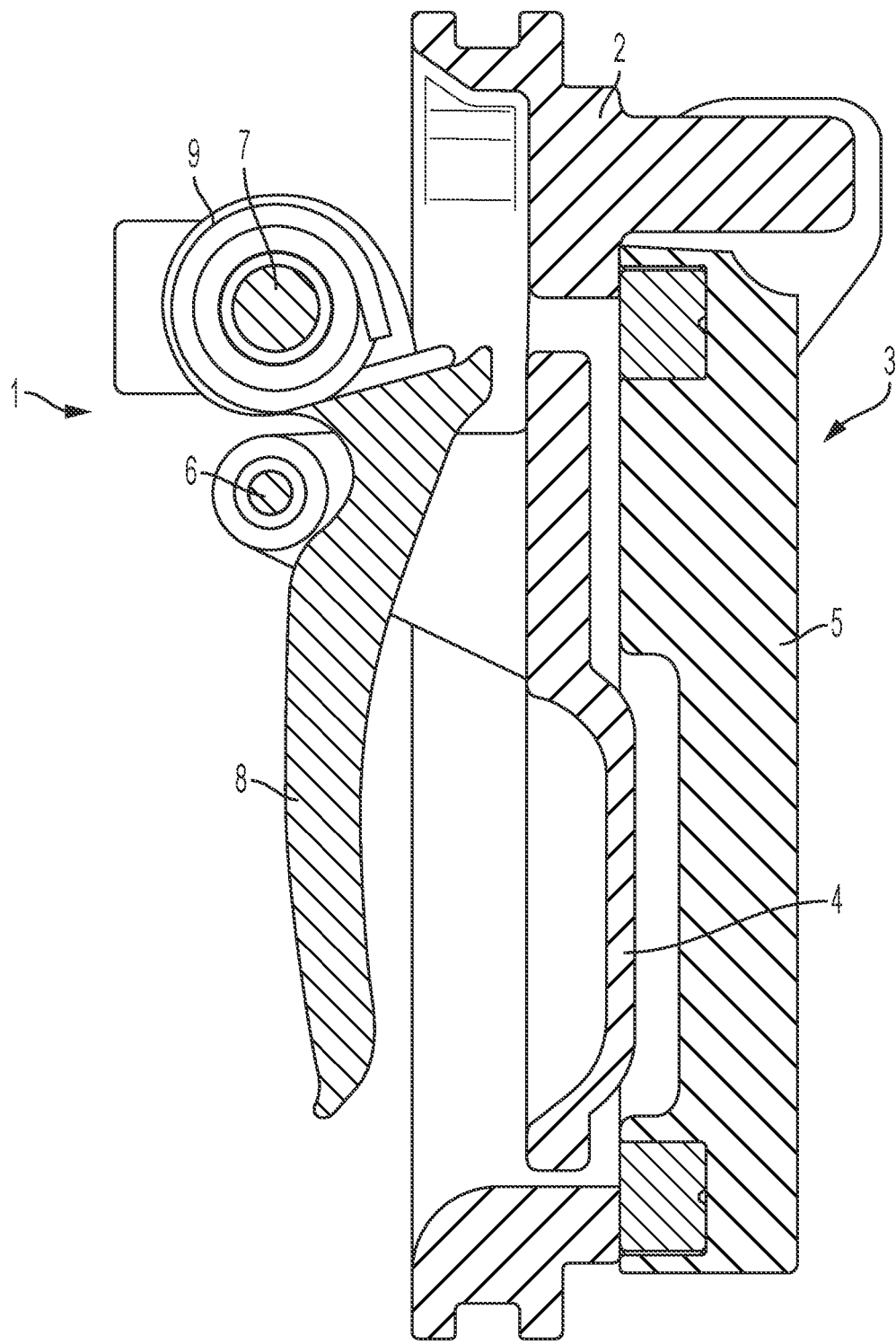
FIG. 1 is a side cross-sectional view of a prior art check valve in an operational position.
Figure 2:
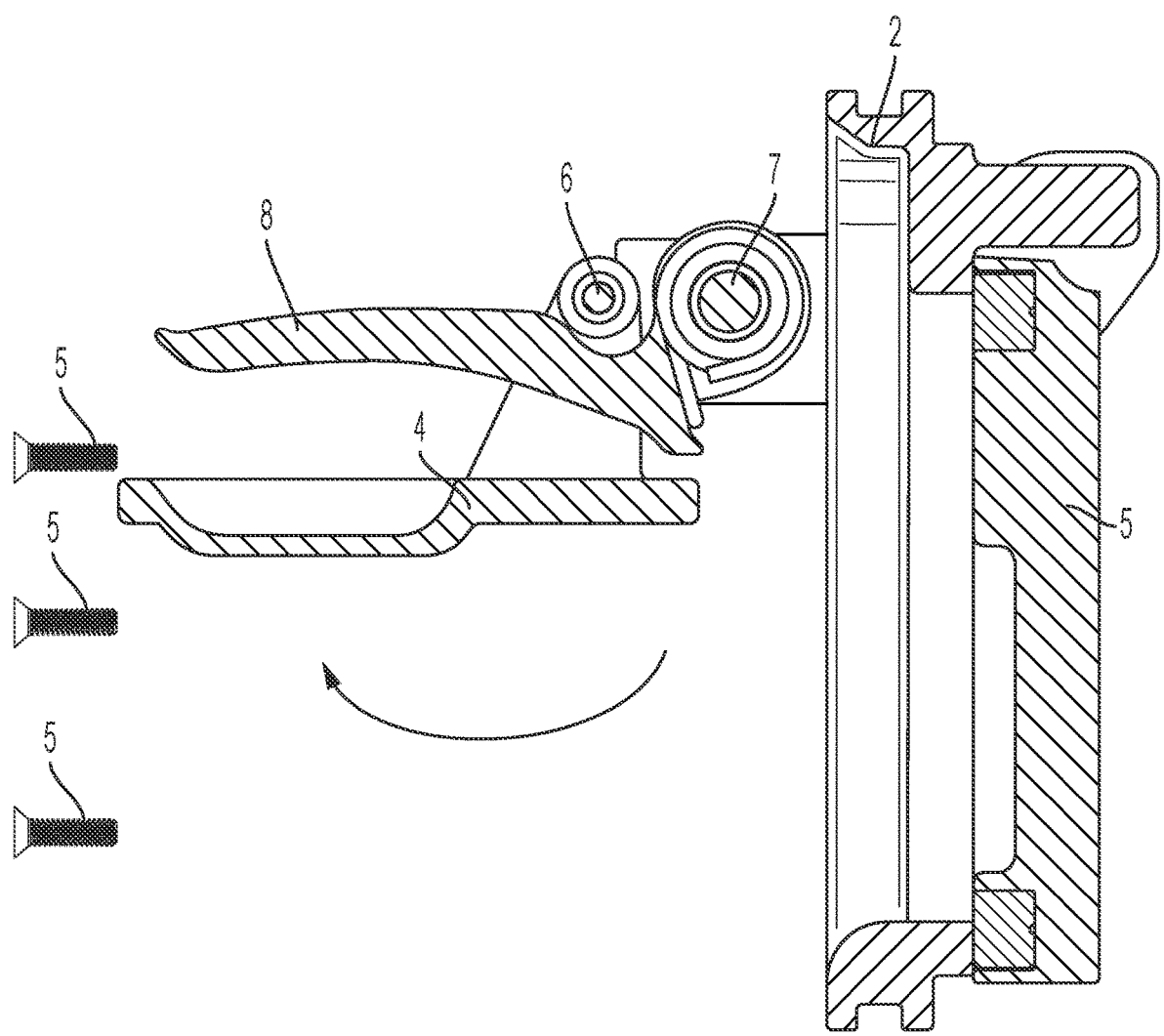
FIG. 2 is a side cross-sectional view of the prior art check valve of FIG. 1.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

The terms "first", "second", and the like are not intended to refer to any particular order or chronology, but refer to different conditions, properties, or elements.

The term "includes" is synonymous with "comprises".

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values The present disclosure is related to a check valve assembly 10 that is used in a piping system. The check valve assembly 10 is disposed within a valve body that surrounds the check valve assembly 10. While used within a valve body and piping system, the check valve assembly 10 of the present application is directed towards features that are used during maintenance of the assembly 10, when the assembly 10 has been removed or isolated from the greater system. Therefore the features of the check valve assembly 10 will be described independently of the system in which the assembly 10 is used. However, when in use, the check valve assembly 10, permits fluid to flow in the directions shown with the arrow F. The direction of fluid flow F defines an upstream U area and a downstream D area relative to the check valve assembly 10. When viewing in FIGS. 1-6, the upstream area U is generally to the left of the page, and the downstream area D is generally to the right. Upstream and downstream also define directions, meaning that if some element extends or moves in the upstream direction, that element is extending or moving in the direction of the upstream area U. If some element extends or moves in the downstream direction, then that element extends or moves in the direction of the downstream area D. Fluid flows in the downstream direction from the upstream area U to the downstream area D.

With reference to FIGS. 1-6, the check valve assembly 10 is shown. The check valve assembly 10 includes a check seat 12 and a clapper assembly 20. The check seat 12 is rounded, and in some embodiments, substantially circular, defining a fluid flow path through the check seat 12. The check seat 12 includes an upstream side 16 and a downstream side 18, defining an interior space 14 therebetween. The interior space 14 is open, so that fluid may flow through the interior space 14 and through the check valve assembly 10 when in use in a piping system. Therefore, the interior space 14 further defines the fluid flow path within the check seat 12.

Connected to the check seat 12 is a clapper assembly 20. The clapper assembly 20 is arranged to obstruct the interior space 14 and to block fluid from flowing through the check valve assembly 10. The clapper assembly 20 forms a fluid tight seal with the check seat 12 on the downstream side 18. The clapper assembly 20 includes a clapper 22 and a seal retainer 24 mounted to the clapper 22. The clapper 22 includes a clapper body 26, and the seal retainer 24 includes a seal retainer body 28. The seal retainer 24 is mounted to the clapper 22, so that when the check valve assembly 10 is in use within a piping system, both the seal retainer body 28 and the clapper body 26 obstruct the fluid flow through the interior space 14. As shown, the seal retainer 24 is disposed upstream of the clapper 22, and the clapper 22 is disposed downstream of the seal retainer 24. Fasteners 30 connect the seal retainer 24 and clapper 22. As shown, the fasteners 30 are screws, but other fasteners known to those in the art may be used. The fasteners 30 may be arranged about the seal retainer body 28 and the clapper 26 in a specific manner. Although not shown, both the bodies 26, 28 have corresponding apertures to receive the fasteners 30. To facilitate the connection between the clapper 22 and the seal retainer 24, a rubber seal 32 is arranged about the clapper body 26 on an upstream side. The rubber seal 32 extends circumferentially about the clapper body 26, so that the clapper 22 essentially sits on the rubber seal 32 against the seal retainer 24. The clapper body 26 may include a corresponding cavity extending about a downstream side of the clapper body 26 to receive the rubber seal 32. The rubber seal 32 helps to prevent leakage through the seal retainer 24 and clapper 22. The rubber seal 32 may also contact the downstream side 18 to obstruct fluid flow.

The clapper 22 is connected to the check seat 12 on the downstream side 18 by a hinge 34. The hinge 34 includes a clapper hinge portion 36 that engages with a check seat hinge portion 38. In particular, the clapper hinge portion 36 includes two sides 36A, 36B extending from a top portion of the clapper 22 that receive the check seat hinge portion 38 therebetween. A pin 37 or other connecting mechanism can be received through the respective hinge portions 36A, 36B, 38 to form the hinge 34. The hinge 34 allows for the clapper assembly 20 to pivot and rotate relative to the check seat 12 when the fluid flow reaches the cracking pressure. When fluid flow reaches the cracking pressure, the pressure from the fluid flow opens the clapper assembly 20, forcing the clapper assembly 20 to rotate about the hinge 34. Since the seal retainer 24 is the most upstream portion of the clapper assembly 20, the fluid presses against the seal retainer 24 to open the clapper assembly 20.

Extending from the upstream side 16 of the check seat 12 is a first extension 40. The first extension 40 includes a shaft 42 arranged between a first leg 44 and a second leg 46. The shaft 42 defines an axis A1 between the legs 44, 46, meaning that the legs 44, 46, both extend from the upstream side 16, defining a substantially perpendicular angle with the face of the upstream side 16. The shaft 42 extends generally parallel to the face of the upstream side 16. In other words, the shaft 42 extends perpendicular to the direction of fluid flow F. In other embodiments, the shaft 42 may not extend parallel to the face of the upstream side 16.

A cam arm 48 is connected to the first extension 40, such that the cam arm 48 is rotatable about the shaft 42. As shown, the cam arm 48 includes a body with a first end 52 and a second end 54, with the first end 52 being mounted to the shaft 42. The first end 52 can define an aperture, so that the shaft 42 is received within the first end 52. Parts of the body 50 are rounded or curved, as shown in the figures. For example, the body 50 defines a notch 56 between the first end 52 and the second end 54. The notch 56 is essentially a path along the body 50, and it also defines a bearing surface 58, the purposes of which will be described in greater detail below. While the cam arm 48 has different curves making up its shape, if a straight line is formed between the first end 52 and the second end 54, the straight line is generally perpendicular to the direction of fluid flow F.

A torsion spring 60 is arranged about the shaft 42 and contacts the cam arm 48 at or near the first end 52. The torsion spring 60 applies a biasing force to the cam arm 48, urging the cam arm 48 to rotate about the shaft 42 in a clockwise direction. Extending from the first end 52 is a stopper 62. The extension of the stopper 62 terminates at a boundary point. The function of the stopper 62 will be discussed in greater detail below. The stopper 62 defines a receiving slot with the first end 52, so that the torsion spring 60 can extend through the receiving slot 64 and around the first end 52 to apply its biasing force to both sides of the cam arm 48. This biasing force is transferred from the cam arm 48 to the clapper assembly 20 via a second extension 68.

The second extension 68 extends from the seal retainer 24 in the upstream direction. The second extension 68 includes a first leg 70 and a second leg 72, with a shaft 74 extending therebetween. The shaft 74 may also include or define a roller that also extends between the legs 70, 72. The shaft 74 is aligned between the legs 70, 72 to define an axis A2. This means that each leg 70, 72 extends from the seal retainer 24 and the shaft 74 extends between the legs 70, 72 to define the axis A2. The legs 70, 72 extend perpendicularly to the upstream face of the seal retainer 24, and the shaft 74 extends parallel to the upstream face of the seal retainer 24. The notch 56 is shaped so that it receives at least a portion of the shaft 74 therein. The bearing surface 58 is arranged to contact the shaft 74 during operation of the valve assembly 10. The bearing surface 58 is curved or otherwise shaped to repeatedly contact the shaft 74 during use. With these shapes and engagements, the notch 56 can be considered a path on which the shaft 74 travels during use of the valve assembly 10.

The cam arm 48 is arranged relative to the second extension 68, so that the biasing force of the torsion spring 60 is transferred through the cam arm 48 to the second extension 68 via the contact between the bearing surface 58 and the shaft 74. The bearing surface 58 is urged to move in the clockwise direction when contacting the shaft 74, which pushes the shaft 74 in that same clockwise direction. Via the first leg 70 and the second leg 72, the seal retainer 24 is also urged to move in the clockwise direction. Because the seal retainer 24 is connected to the clapper 22, the clapper 22 is urged in the same direction until movement is stopped due to the contact between the clapper 22 and the downstream side 18 of the check seat 12. This places the clapper assembly 20 in the closed position, where the fluid flow is obstructed within the check seat 12 by the clapper assembly 20. To open the clapper assembly 20, the force of the fluid flow must create a pressure against the clapper assembly 20 that overcomes the force applied by the torsion spring 60. The cracking pressure may be equal to or be a function of the force applied by the torsion spring 60.

The check valve assembly 10 operates when the pressure created by fluid forces acting against the clapper assembly 20 overcome the biasing forces created by the torsion spring 60. When this happens, the clapper assembly 20 opens and pivots, rotating counter clockwise about the hinge 34. This causes the second extension 68 to also rotate, forcing the shaft 74 to act on the bearing surface 58 to rotate the cam arm 48 against the force of the torsion spring 60. As the clapper assembly 20 continues to open, the shaft 74 moves along and out of the path defined by the notch 56 and along the cam arm body 50 in the direction of the second end 54. When the fluid forces decrease, such that the force applied by the torsion spring 60 is greater than the fluid forces, the clapper assembly 20 pivots in the opposite direction, with the shaft 74 moving up the cam arm body 50 in the direction of the first end 52, until the clapper assembly 20 is closed and the clapper 22 sits against the check seat 12.

Figure 3:
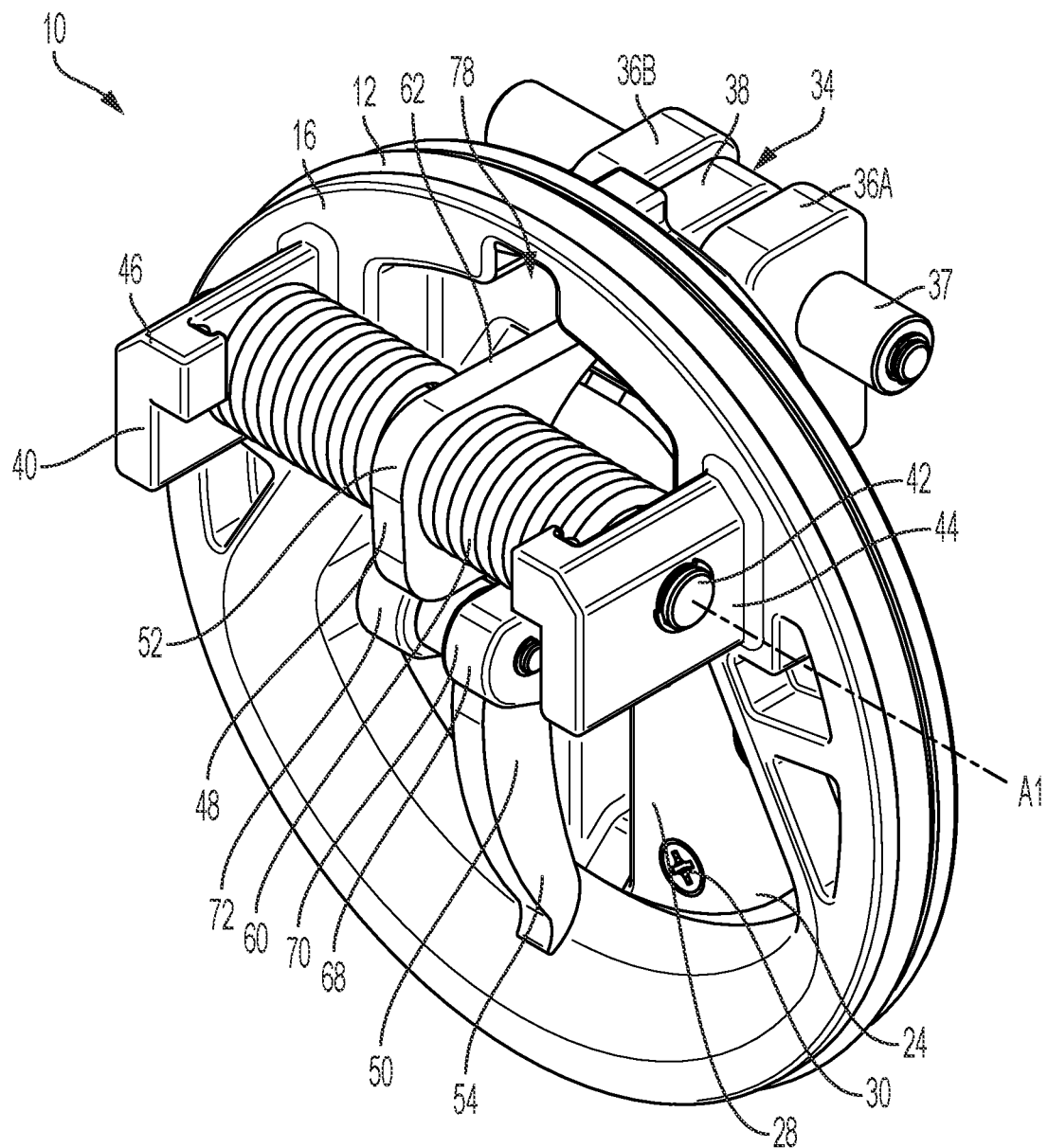
FIG. 3 is a perspective view of an upstream side of a check valve according to one aspect or embodiment of the present disclosure.
Figure 4:
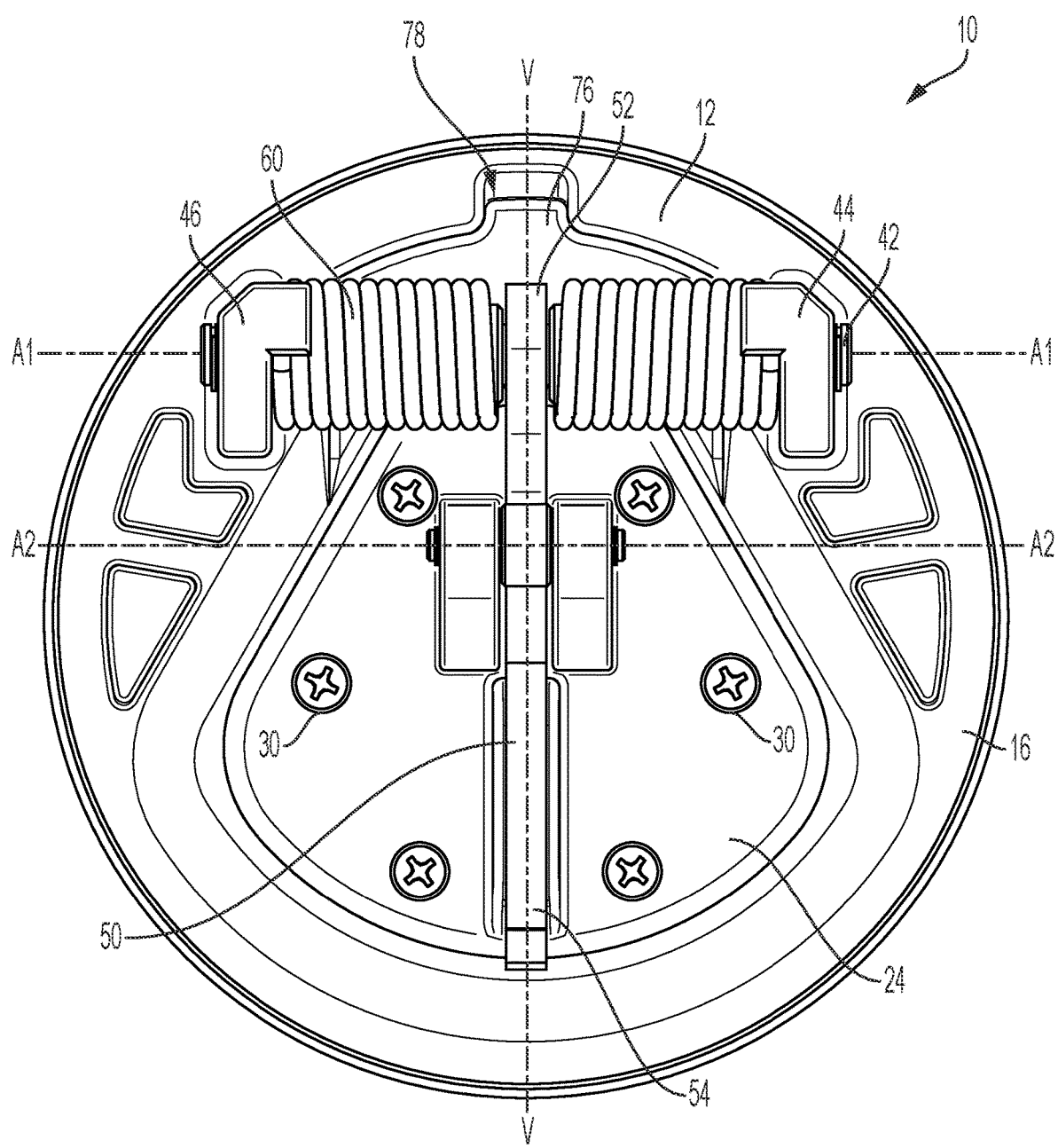
FIG. 4 is a front view of the check valve looking in the downstream direction.
Figure 5:
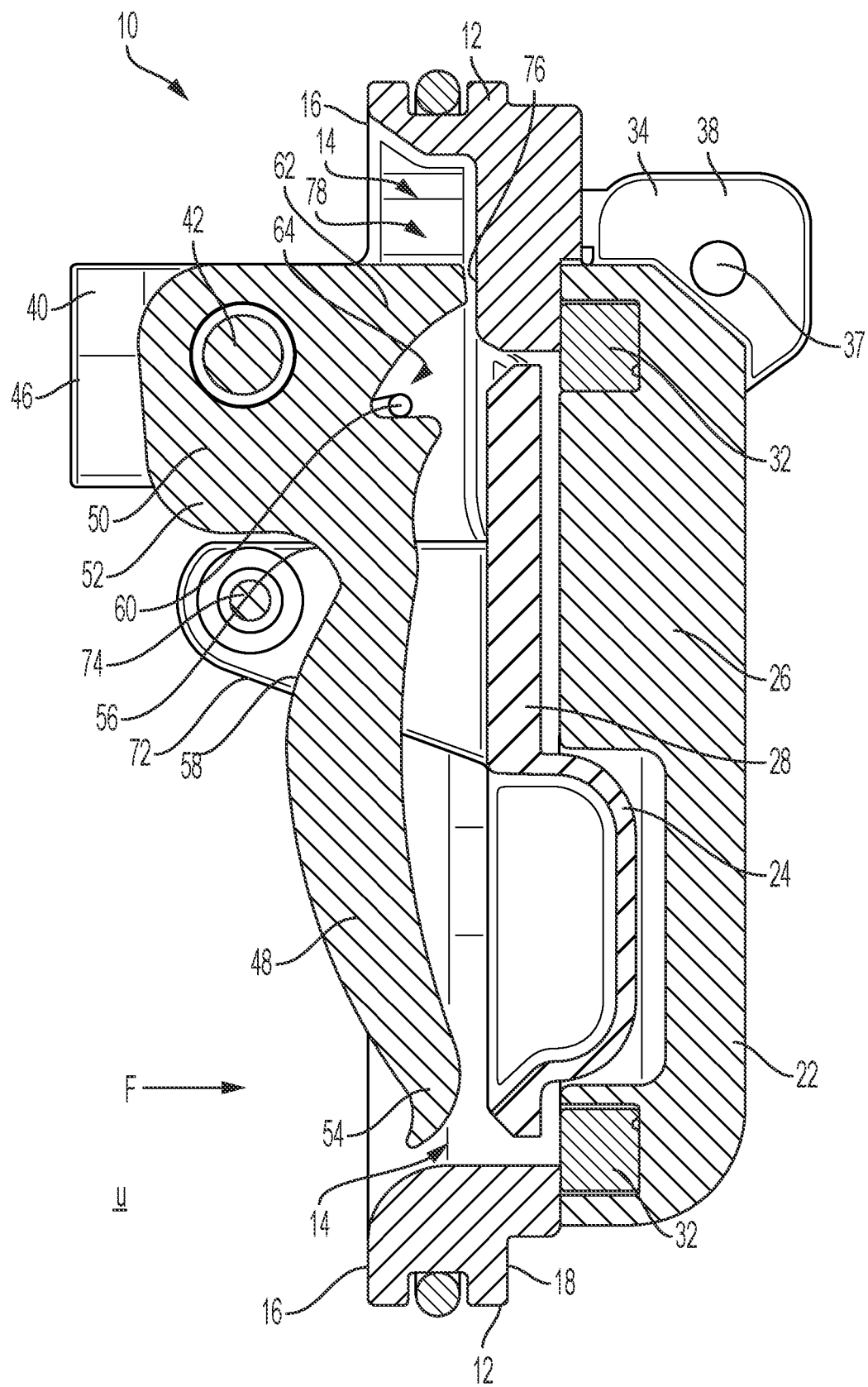
FIG. 5 is a cross-sectional side view of the check valve of FIG. 4 taken along line V-V in a closed position.
Figure 6:
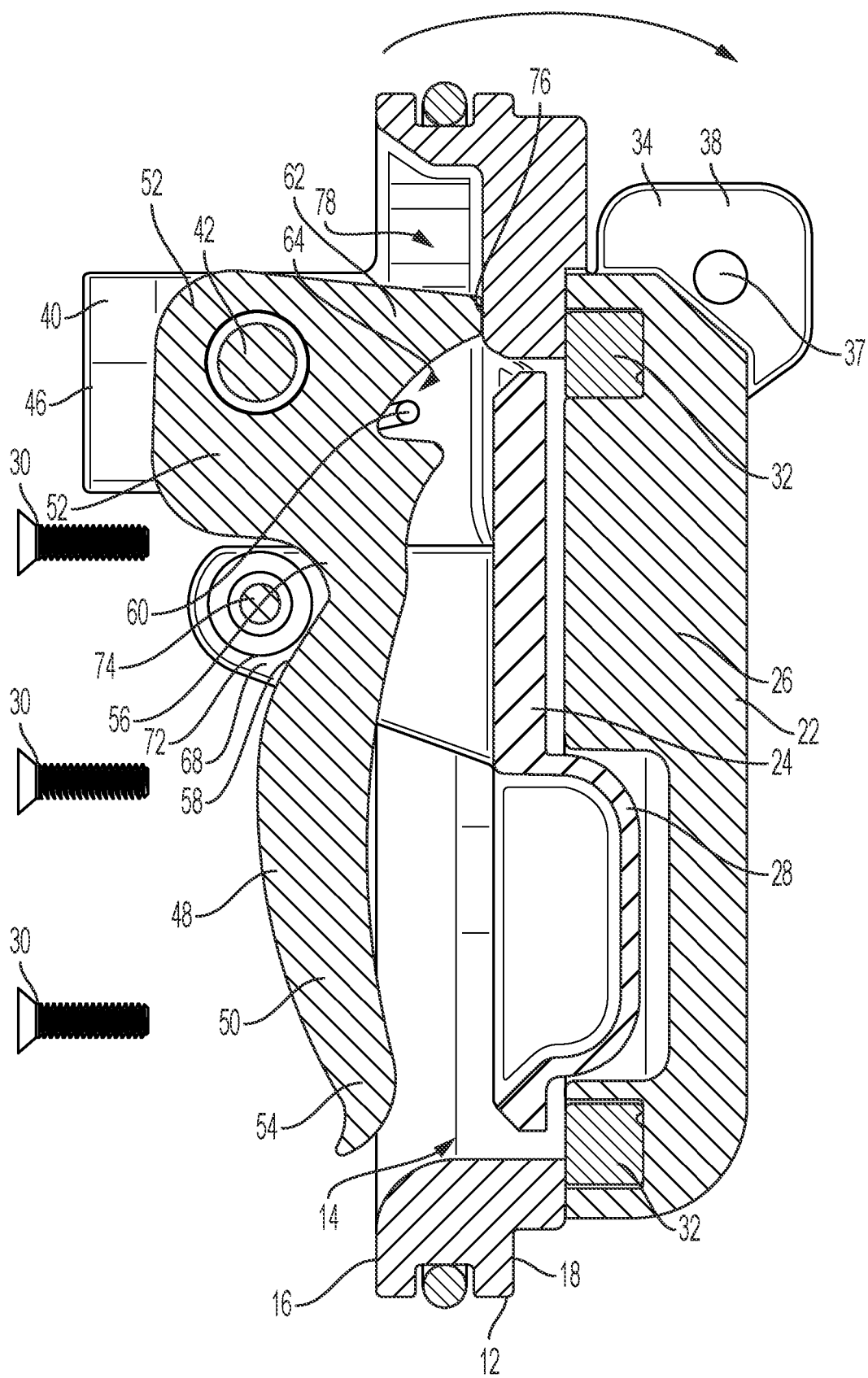
FIG. 6 is a cross-sectional side view of the check valve of FIG. 4 taken along line V-V in a maintenance position.

The operation of the check valve assembly 10 during maintenance will now be discussed in connection with FIGS. 3-5. When the check valve assembly 10 is removed from a valve or piping system, it can be placed in a maintenance position. In the maintenance position, the fasteners 30 are removed from their respective apertures, so that the seal retainer 24 is dismounted from the clapper 22. Because the clapper 22 contacts the downstream side 18 of the check seat 12 to prevent the clapper assembly 20 from moving further in the upstream direction, the seal retainer 24 can now freely rotate in the clockwise direction as a result of the forces acting on the second extension 68 via the cam arm 48 and torsion spring 60. The forces generated by the torsion spring 60 are strong enough to quickly and violently rotate the cam arm 48, second extension 68, and seal retainer 24 in the clockwise direction. The direction of movement is identified by the arrow in FIG. 6.

To prevent this, the stopper 62 extends a distance from the first end 52 of the cam arm 48, terminating at a boundary point. As shown, the stopper 62 extends in the downstream direction, with the boundary point located downstream of the first end 52 and the shaft 42. The stopper 62 extends a distance downstream, such that upon rotation of the cam arm 48, the stopper 62 contacts a portion of the upstream side 16 of the check seat 12 as shown in FIG. 5. In particular, the stopper 62 contacts a contact surface 76 on the check seat 12. The contact surface 76 may be substantially flat or shaped to withstand repeated contact by the stopper 62. The stopper 62 may also be shaped to withstand repeated contact. As shown, the stopper 62 is shaped like a rectangular prism, with a flat surface to contact the contact surface 76, but other shapes and surfaces may be used. The contact surface 76 may be disposed inside of a cavity 78 defined within a portion of the check seat 12. When located within the cavity 78, the contact surface 76 is located downstream of a majority of the upstream side 16 of the check seat. As shown, the contact surface 76 and cavity 78 are disposed above the axis A2 of the shaft 74. However, the contact surface 76 may be disposed at a point that is even with or slightly below the axis A2 of the shaft 74. The location of the contact surface 76 should be such that rotation of the cam arm 48 is limited when the seal retainer 24 is dismounted from the clapper 22. In one example, the cam arm 48 may rotate 0-5 degrees before the stopper 62 is impeded by the contact surface 76. In another embodiment, the cam arm 48 may rotate 5-10 degrees before the stopper 62 is impeded by the contact surface 76. In yet another embodiment, the cam arm 48 may rotate 10-15 degrees before the stopper 62 is impeded by the contact surface 76. In other embodiments, the distance the stopper 62 extends from the first end 52 may be changed based on the desired rotational movement of the cam arm 48 about the shaft 42. The stopper 62 may also extend a distance that allows the stopper 62 to be worn down after repeated contact with the contact surface 76. For example, the stopper 62 may extend a distance from the first end 52, such that the cam arm 48 rotates approximately 3-5 degrees before that rotation is impeded by contact between the stopper 62 and the contact surface 76. Then, as this contact repeatedly occurs, the stopper 62 becomes compressed such that the distance it extends from the first end 52 becomes shorter. Then, during later uses, the cam arm 48 rotates 6-8 degrees before that rotation is impeded by contact between the stopper 62 and the contact surface 76.

While specific embodiments of the devices of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A spring stop arrangement comprising:
a check seat defining a flow path;
a clapper assembly connected to the check seat and configured to obstruct the flow path, the clapper assembly comprising:
  a clapper; and
  a seal retainer detachably mounted to the clapper;
a cam arm connected to an upstream side of the check seat, the cam arm comprising a stopper; and
a torsion spring operatively connected to the cam arm so as to apply a biasing force to the cam arm against the direction of fluid flow,
wherein, when the seal retainer is dismounted from the clapper, thereby removing the biasing force from the clapper, the stopper is configured to contact the check seat so as to prevent rotation of the cam arm.

2. The spring stop arrangement of claim 1, wherein the check seat comprises a first extension extending in an upstream direction, the first extension comprising a first shaft about which the cam arm is rotatably mounted, and
wherein the torsion spring at least partially extends about the first shaft.

3. The spring stop arrangement of claim 2, wherein the stopper extends from a portion of the cam arm proximate the first shaft, and
wherein the stopper extends to a boundary point.

4. The spring stop arrangement of claim 1, wherein the check seat defines a cavity configured to receive the stopper therein upon the dismounting of the seal retainer from the clapper.

5. The spring stop arrangement of claim 1, wherein the seal retainer comprises a second extension extending in an upstream direction, the second extension comprising a second shaft defining a roller, and
wherein, when the seal retainer is mounted to the clapper, the cam arm is configured to contact the roller so as to bias the clapper assembly against the direction of fluid flow, thereby obstructing the flow path.

6. The spring stop arrangement of claim 5, wherein the cam arm defines a path configured to receive at least a portion of the second shaft therein.

7. The spring stop arrangement of claim 6, wherein the path defines a bearing surface configured to contact the second shaft.

8. The spring stop arrangement of claim 1, wherein the seal retainer defines a cavity configured to receive at least a portion of the cam arm therein.

9. The spring stop arrangement of claim 1, wherein the check seat comprises an upstream side and a downstream side, and
wherein the stopper contacts the upstream side.

10. The spring stop arrangement of claim 9, wherein the clapper assembly is mounted to the downstream side.

11. The spring stop arrangement of claim 10, wherein the clapper is hingedly mounted to the downstream side.

12. The spring stop arrangement of claim 1, wherein the seal retainer is mounted to the check seat by at least one fastener.

13. A spring stop arrangement comprising:
a check seat extending from the valve body, the check seat comprising:
  an upstream side;
  a downstream side opposing the upstream side;
  an interior portion extending between the upstream side and the downstream side, the interior portion defining a fluid flow path; and
  a first extension extending from the upstream side in an upstream direction;
a clapper assembly connected to the downstream side and configured to obstruct the flow path, the clapper assembly comprising:
  a clapper;
  a seal retainer detachably mounted to the clapper; and
  a second extension extending from the seal retainer in the upstream direction;
a cam arm rotatably mounted to the first extension, the cam arm comprising a stopper; and a torsion spring operatively connected to the cam arm so as to apply a biasing force to the cam arm against the direction of fluid flow, wherein, when the seal retainer is mounted to the clapper, the cam arm is configured to contact the second extension so as to bias the clapper assembly against the direction of fluid flow, thereby obstructing the flow path, wherein, when the seal retainer is dismounted from the clapper, the stopper is configured to contact the upstream side so as to prevent rotation of the cam arm.

14. The spring stop arrangement of claim 13, wherein the cam arm comprises a body having a first end and a second end, the first end being rotatably mounted to the first extension.

15. The spring stop arrangement of claim 14, wherein the stopper extends from the first end to a boundary point, the stopper and the first end defining a receiving slot therebetween, the receiving slot configured to receive a portion of the torsion spring therein.

16. The spring stop arrangement of claim 15, wherein the torsion spring extends about the first extension with a first portion of the torsion spring extending about the first extension on one side of the cam arm and a second portion of the torsion spring extending about the first extension on an opposing side of the cam arm, and wherein the portion of the torsion spring received within the receiving slot connects the first portion and the second portion.

17. The spring stop arrangement of claim 16, wherein the first extension comprises a shaft, and wherein the first end of the cam arm is rotatably mounted to the shaft, and the torsion spring extends about the shaft.

18. The spring stop arrangement of claim 14, wherein the cam arm defines a path disposed between the first end and the second end, the path being configured to receive at least a portion of the second shaft therein.

19. The spring stop arrangement of claim 13, wherein the upstream side defines a cavity configured to receive the stopper therein.

20. The spring stop arrangement of claim 19, wherein the cavity comprises a contact surface to contact the stopper when the seal retainer is dismounted from the clapper.

* * * * *